(12) United States Patent
Bhat (10) Patent No.: US 6,496,017 B2
(45) Date of Patent: Dec. 17, 2002

(54) MEASURING ANTENNA SIGNAL STRENGTH WITH AUTOMATIC GAIN CONTROL RECEIVER

(75) Inventor: Janardhana Bhat, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/772,478

(22) Filed: Jan. 29, 2001

(65) Prior Publication Data

US 2001/0028244 A1 Oct. 11, 2001

(30) Foreign Application Priority Data

Feb. 2, 2000 (SG) .......................................... 200000591

(51) Int. Cl.[7] ............................ G01R 27/28; H01N 5/52; G01S 13/00
(52) U.S. Cl. ............................ 324/616; 348/678; 342/92
(58) Field of Search .......................... 324/616, 613, 324/614, 615, 620; 348/678; 342/92

(56) References Cited

U.S. PATENT DOCUMENTS

| | | | |
|---|---|---|---|
| 4,403,346 A | 9/1983 | Ogawa | ...................... 455/189 |
| 4,590,613 A | 5/1986 | Tannery | ...................... 455/200 |
| 5,940,143 A | * 8/1999 | Igarashi et al. | .............. 348/678 |

FOREIGN PATENT DOCUMENTS

JP  09163265 A  6/1997  ............ H04N/5/52

* cited by examiner

*Primary Examiner*—Christine Oda
*Assistant Examiner*—James Kerveros (57) ABSTRACT

Apparatus and method for measuring an antenna signal strength (X). The apparatus includes a first amplifier section (3) for receiving an antenna signal and having a first automatic gain control stage; a second amplifier section (8) having a second automatic gain control stage; an automatic gain control system (12; 16') for generating automatic gain control signals ($V_{RF\,AGC}$, $V_{IF\,AGC}$) for the first and second amplifier sections in accordance with a delayed automatic gain control scheme with a take-over-point. In order to measure the antenna signal strength, the take-over-point is automatically shifted towards the actual antenna signal strength.

22 Claims, 7 Drawing Sheets

MEASURING ANTENNA SIGNAL STRENGTH WITH AUTOMATIC GAIN CONTROL RECEIVER

FIELD OF THE INVENTION

The present invention relates to an arrangement for measuring antenna signal strength, the arrangement comprising:

a first amplifier section for receiving an antenna signal for providing a first output signal, and having a first automatic gain control stage with a first attenuation factor controlled by a first automatic gain control signal;

a second amplifier section for receiving a first input signal, derived from said first output signal, for providing a second output signal, and having a second automatic gain control stage with a second attenuation factor controlled by a second automatic gain control signal;

automatic gain control means arranged to receive a second input signal derived from the second output signal and to generate said first and second automatic gain control signals in dependence on the second output signal;

the arrangement being arranged such that:

for values of said antenna signal below a predetermined threshold level, only said second automatic gain control stage may be active with increasing second attenuation factor with increasing values of the antenna signal; and for values of said antenna signal above said predetermined threshold level, said first automatic gain control stage is active with increasing first attenuation factor with increasing values of the antenna signal.

DESCRIPTION OF THE PRIOR ART

Such an arrangement is known from U.S. Pat. No. 4,403,346. The arrangement known from this prior art document will be illustrated with reference to FIG. 1 which is also presented as FIG. 7 in that document.

Figure 1:
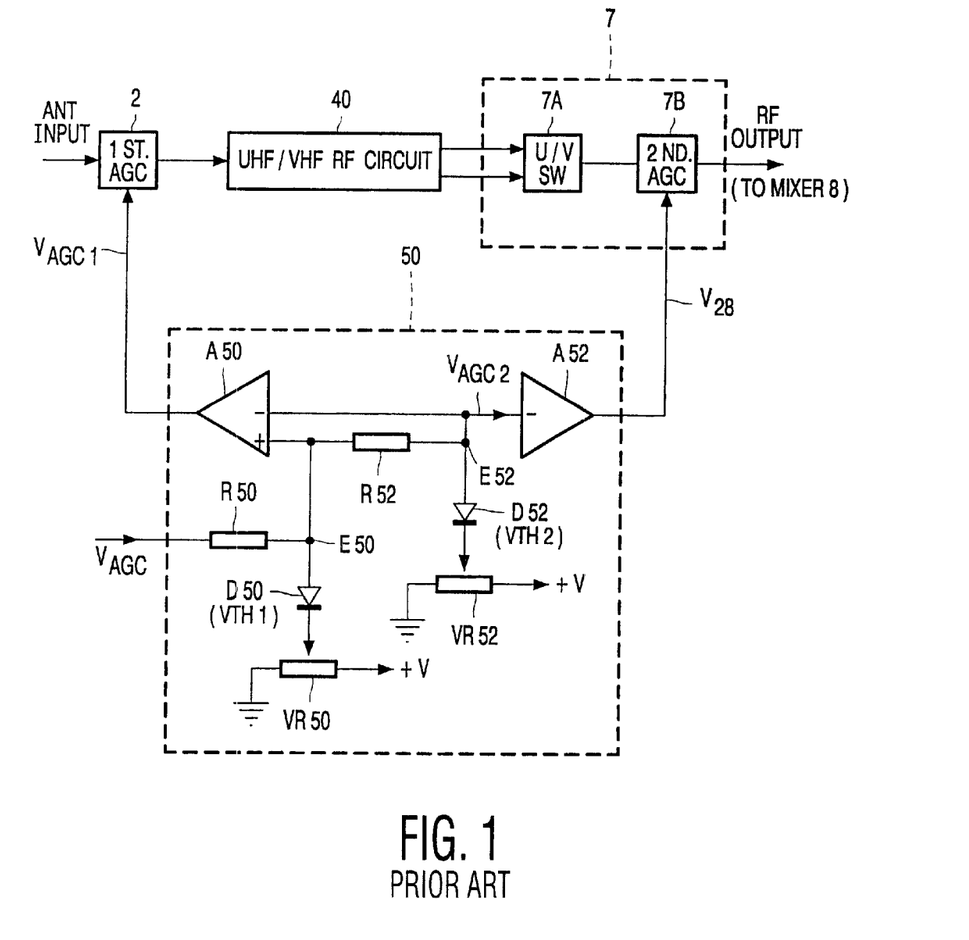
FIG. 1 shows a tuner arrangement according to the prior art.

FIG. 1 shows an automatic gain control (AGC) circuit for a wide band tuner as used in television systems. An antenna (not shown) receives a signal and generates an output signal ANT INPUT applied to a first AGC stage 2. The output of the first AGC stage 2 is sent to an UHF/VHF RF circuit 40. Typically, the UHF/VHF RF circuit will comprise three parallel circuits, two for two different VHF frequency bands and one for one UHF frequency band. Instead of three different bands, one band may also be applied depending on the application concerned.

The output of the RF circuit is connected to the input of an UHF/VHF selection switch 7. The selection switch comprises an U/V switch 7a and a second AGC stage 7B in series. The output of the selection switch 7 is fed to two superheterodyne sections which are not shown in FIG. 1. Superheterodyne sections and the way they operate are known to persons skilled in the art and need no further explanation here. The output of the second superheterodyne section is a demodulated picture signal. Moreover, the second superheterodyne section generates an AGC control voltage $V_{AGC}$ which is an input to an AGC signal source 50.

The AGC signal source 50 comprises a differential amplifier A50 and an inverting amplifier A52. The input of the inverting amplifier A52 is connected to the inverting input of the differential amplifier A50. The non-inverting input of the differential amplifier A50 is connected to a node E50 which is connected to the AGC control voltage $V_{AGC}$ through a resistor R50. Node E50 is also connected to the input of inverting amplifier A52 and to the anode of a diode D50. The cathode of diode D50 is connected to a slider of a trimmer resistor VR50, one side of which is connected to a power supply voltage and the other side of which is connected to ground.

The connection point between resistor R52 and the inverting amplifier A52 is called E52 and is also connected to the anode of a diode D52. The cathode of the diode D52 is connected to a slider of a trimmer resistor VR52, one side of which is connected to the power supply voltage and the other side of which is connected to ground.

When the voltage on node E50 is above a threshold voltage $V_{TH1}$, diode D50 will conduct. Below this value, diode D50 will be blocked. When the voltage on node E52 is above a threshold voltage $V_{TH2}$, diode D52 will conduct. Below this value, diode D52 will be blocked. The trimmer resistors are set such that $V_{TH1} > V_{TH2}$.

The output voltage of differential amplifier A50 is used as AGC control signal $V_{AGC1}$ for the first AGC stage 2. The output voltage of inverting amplifier A52 is used as AGC control signal V28 for the second AGC stage 7B.

Figure 2:
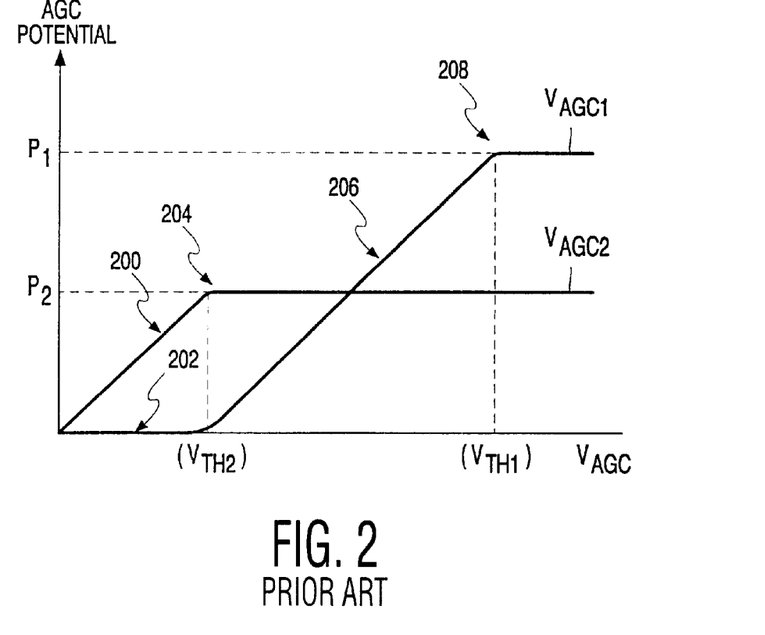
FIGS. 2 and 3 show some diagrams to explain the operation of the prior art arrangement of FIG. 1.

Now, the operation of the arrangement of FIG. 1 will be explained with reference to FIGS. 2 and 3 which are identical to FIGS. 8 and 9, respectively, of U.S. Pat. No. 4,403,346. As shown in FIG. 2, as long as $V_{AGC}$ is below $V_{TH2}$, neither diode D50 nor diode D52 is conducting. Then, $V_{AGC2}$ (input voltage of inverting amplifier A52) shows a linear relationship with $V_{AGC}$. Since almost no voltage difference will be present between the differential inputs of differential amplifier A50, $V_{AGC1}$ will be substantially equal to 0 V.

When $V_{AGC}$ exceeds threshold voltage $V_{TH2}$, diode D52 starts conducting and the input voltage $V_{AGC2}$ of inverting amplifier A52 remains fixed at a predetermined level P2. However, from that moment onwards, a current flows through resistor R52 and a voltage difference will be built up between the inputs of differential amplifier A50. Then, $V_{AGC1}$ shows a linear relationship with $V_{AGC}$.

However, upon $V_{AGC}$ exceeding threshold level $V_{TH1}$, diode D50 starts conducting, resulting in node E50 remaining at a fixed voltage. Therefore, for $V_{AGC}$ values above $V_{TH1}$, the value of $V_{AGC1}$ remains fixed at a predetermined level P1.

Figure 3:
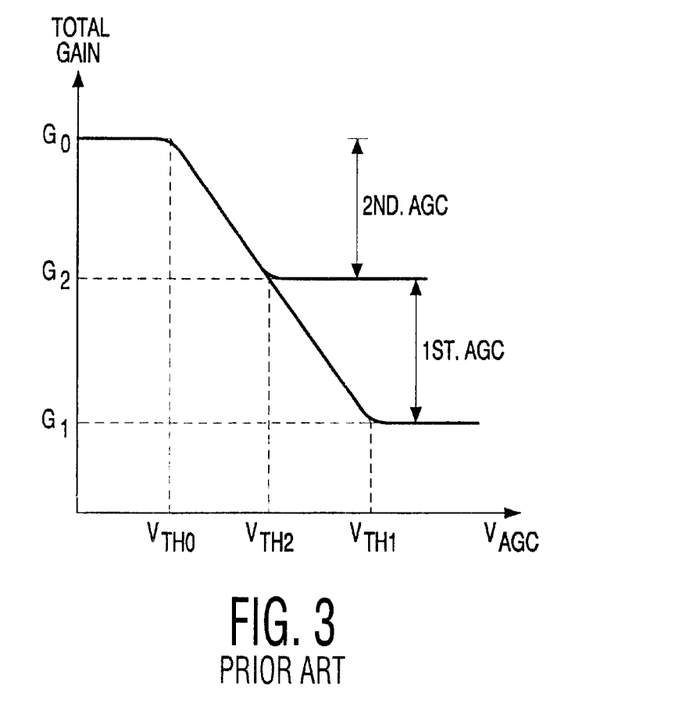

FIG. 3 shows the total gain of the tuner including components 2, 40, 7 in dependence on the value of control voltage $V_{AGC}$. The first AGC stage 2 and the second AGC stage 7B are both implemented in such a way that their respective gains are at maximum when their AGC control voltages $V_{AGC1}$ and $V_{AGC2}$, respectively, equal 0 V and their gains can only decrease with increasing values of AGC control voltages $V_{AGC1}$ and $V_{AGC2}$, respectively.

As long as $V_{AGC}$ is below a predetermined threshold value $V_{TH0}$ ($V_{TH0} < V_{TH2}$), both AGC stages 2, 7B show maximum gains and the total tuner gain is $G_0$. When $V_{AGC}$ exceeds threshold voltage $V_{TH0}$, the second AGC stage 7B starts to show a linearly decreasing gain relation with increasing values of $V_{AGC}$ until $V_{AGC}$ reaches threshold $V_{TH2}$. From that moment onwards, $V_{AGC2}$ remains fixed and the attenuation factor of the second AGC stage 7B remains fixed. Moreover, from that moment onwards, $V_{AGC1}$ starts to show an increasing linear relation with $V_{AGC}$ (FIG. 2) and the first AGC stage 2 starts to show a linearly decreasing gain relation with increasing $V_{AGC}$. When $V_{AGC}$ exceeds threshold $V_{TH1}$ also control voltage $V_{AGC1}$ remains fixed (see FIG.

2). So, for values of $V_{AGC}$ above $V_{TH1}$ both AGC stages 2, 7B remain at a fixed attenuation level. The total tuner gain will then remain fixed at a predetermined value of $G_1$.

Since the attenuation of the first AGC stage 2 only starts after the attenuation of the second AGC stage 7B has reached its maximum, the concept of AGC shown in FIGS. 1, 2 and 3 is also known as "delayed AGC".

As described above, the signal $V_{AGC}$ is generated by the superheterodyne section (not shown) that outputs the demodulated picture signal. Thus, essentially, the first and second AGC stages 2, 7B in the prior art according to FIG. 1 are controlled by the output of the arrangement itself. In practice, the value of threshold $V_{TH0}$ (FIG. 3) is determined by a reference voltage with which the demodulated picture signal is to be compared. The thresholds $V_{TH1}$ and $V_{TH2}$ are determined by the settings of the sliders of variable resistors VR50 and VR52. These settings are made in the tuner factory and will, normally, not be accessible to buyers of the tuners.

SUMMARY OF THE INVENTION

The object of the present invention is to provide a tuner arrangement arranged to measure and possibly display the strength of the antenna signal supplied to the tuner arrangement.

This object is obtained by an arrangement as defined in the opening paragraph, wherein a processor is provided which is arranged to calculate said antenna signal strength in accordance with the following steps:

(a) establishing whether or not said first automatic gain control stage is active;

(b) if said first automatic gain control stage is active, increasing said predetermined threshold level to a first new threshold level such that this first new threshold level is equal to said antenna signal strength and the first automatic gain control stage starts to become inactive, and calculating said antenna signal strength as being equal to said first new threshold level;

(c) if said first automatic gain control stage is inactive, decreasing said predetermined threshold level to a second new threshold level such that this second new threshold level is equal to said antenna signal strength and the first automatic gain control stage starts to become active, and calculating said antenna signal strength as being equal to said second new threshold level.

With such an arrangement, the antenna signal strength can be measured which can be used to align an (outdoor) antenna connected to the arrangement to maximum signal strength reception. This is especially advantageous in those areas where outdoor antennas are used, such as in developing countries.

Such an arrangement can also be used to select a channel having the strongest signal strength of a certain transmitted program. Moreover, signal strengths of channels adjacent to an actual channel can be measured in this way. Then, $V_{TH2}$ can be varied to counteract intermodulation from the adjacent channels and to obtain an optimum signal-to-noise ratio based on channel frequency and signal strength of adjacent channels.

In an alternative embodiment, the present invention relates to an arrangement for measuring an antenna signal strength, the arrangement comprising:

a first amplifier section for receiving an antenna signal, for providing a first output signal, and having a first automatic gain control stage with a first attenuation factor controlled by a first automatic gain control signal;

a second amplifier section for receiving a first input signal derived from said first output signal, for providing a second output signal and being provided with a second automatic gain control stage with a second attenuation factor controlled by a second automatic gain control signal;

automatic gain control means arranged to receive a second input signal derived from the second output signal and to generate said first and second automatic gain control signals in dependence on the second output signal;

the arrangement being arranged such that:

for values of said antenna signal below a predetermined threshold level only said second automatic gain control stage may be active with increasing second attenuation factor with increasing values of the antenna signal;

for values of said antenna signal above said predetermined threshold level said first automatic gain control stage is active with increasing first attenuation factor with increasing values of the antenna signal;

wherein a processor is arranged to calculate said antenna signal strength in accordance with the following steps:

(a) establishing whether or not said first automatic gain control stage is active;

(b) if said first automatic gain control stage is active, increasing said predetermined threshold level to a first new threshold level such that this first new threshold level is equal to said antenna signal strength and the first automatic gain control stage starts to become inactive, and calculating said antenna signal strength as being equal to said first new threshold level; if said predetermined threshold level cannot be increased to said first new threshold level but only to a predetermined maximum level, then, calculating said antenna signal strength as being larger than said predetermined maximum level;

(c) if said first automatic gain control stage is inactive, decreasing said predetermined threshold level to a second new threshold level such that this second new threshold level is equal to said antenna signal strength and the first automatic gain control stage starts to become active, and calculating said antenna signal strength as being equal to said second new threshold level; if said predetermined threshold level cannot be decreased to said second new threshold level but only to a predetermined minimum level, then, calculating said antenna signal strength as being smaller than said predetermined minimum level.

This alternative embodiment has, essentially, the same functionality as the first mentioned embodiment. However, here it is taken into account that shifting of the predetermined threshold towards the actual value of the antenna signal strength may actually not be possible, and only either an upper limit or lower limit of the actual antenna signal strength can be calculated.

Further embodiments of the arrangement according to the invention are claimed in dependent claims.

Moreover, the invention relates to methods of measuring antenna signal strength. The invention also relates to computer program products having instructions for carrying out essential steps of the invention, and to computer readable mediums provided with such computer program products.

BRIEF DESCRIPTION OF THE DRAWINGS

The present invention will be illustrated with reference to the accompanying drawings which are intended to illustrate the invention rather than limit its scope. The scope of the present invention is only limited by the annexed claims.

DESCRIPTION OF PREFERRED EMBODIMENTS

The content of FIGS. 1, 2 and 3 has been explained above.

It is to be noted that the invention will be illustrated with reference to a television receiver, but the principles of the invention are equally applicable in radio receivers and any other kind of wideband AGC controlled receivers.

Figure 4:
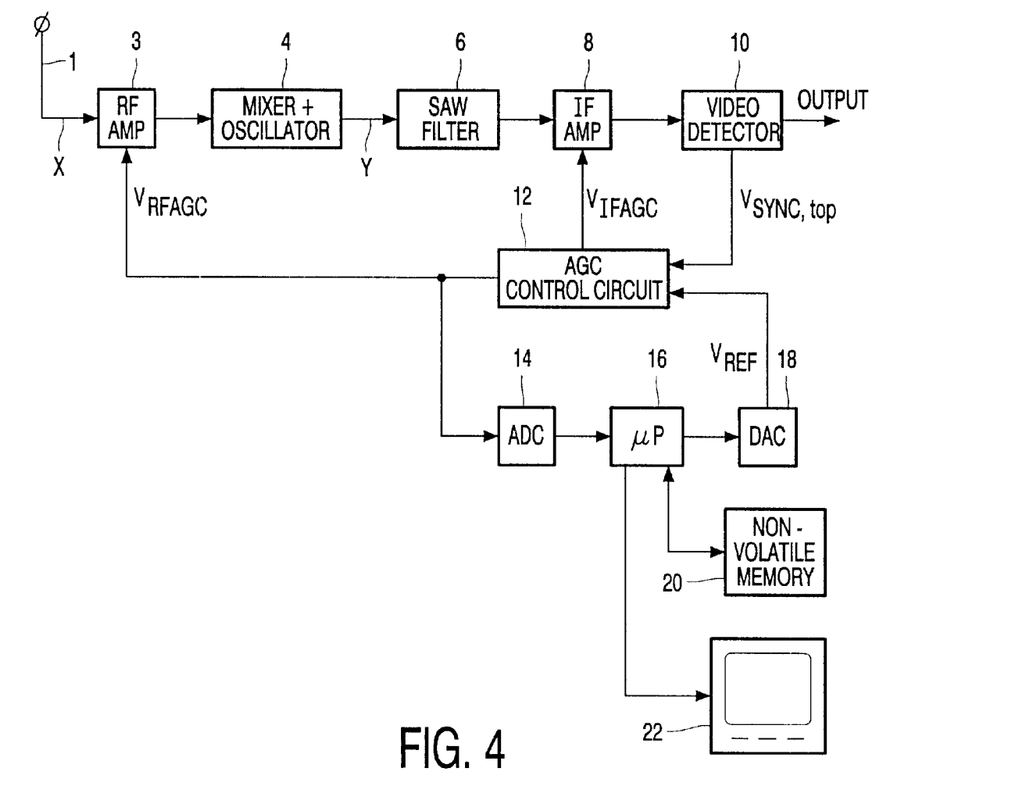
FIG. 4 shows a block diagram of the arrangement according to the invention.

FIG. 4 shows an antenna 1 for receiving a television signal. The antenna supplies a signal X to RF amplifier 3. Actually, the RF amplifier 3 may comprise the circuits 2 (first AGC stage), 40 (UHF/VHF RF circuit) and 7A (U/V switch) of the prior art arrangement shown in FIG. 1. The RF amplifier 3 receives an AGC control signal $V_{RF\ AGC}$ from an AGC control circuit 12.

The output of RF amplifier 3 is connected to a mixer/oscillator circuit 4. The mixer/oscillator circuit may be designed in any way known to persons skilled in the art and its function is to convert a selected channel frequency to a fixed intermediate frequency (IF) by mixing the received RF signal with a locally generated oscillator frequency. The output signal Y of the mixer/oscillator circuit 4 has this intermediate frequency and has an amplitude which depends on the amplitude of signal X and the gain of RF amplifier 3.

The output of the mixer/oscillator circuit 4 is connected to a SAW (Surface Acoustic Wave) filter 6. SAW filters are known to persons skilled in the art and any type of suitable SAW filter can be used. Its function is to operate as a bandpass filter. Instead of a SAW filter, another bandpass filter may be used.

The output of SAW filter 6 is connected to an IF amplifier 8. The IF amplifier has a further input for receiving an AGC control signal $V_{IF\ AGC}$ from the AGC control circuit 12. Thus, like the arrangement of FIG. 1, the arrangement of FIG. 4 is provided with a delayed AGC. Note, however, that the second AGC stage is not provided before the mixer/oscillator circuit, as in FIG. 1, but after the mixer/oscillator circuit. Thus, in FIG. 4, the second AGC stage is in the IF domain. However, in principle, the concept of delayed AGC is the same.

The output of the IF amplifier 8 is connected to a video detector 10 which generates a baseband video signal at its output. The video detector 10 has a further output connected to the AGC control circuit. This further output provides a feedback signal from which the AGC control circuit can derive suitable values for the AGC control signals $V_{RF\ AGC}$ and $V_{IF\ AGC}$. This feedback signal will usually be related to the level of the video signal. For instance, as indicated in FIG. 4, the top sync level signal $V_{sync,\ top}$ may be used as a feedback signal, as is known to persons skilled in the art.

The AGC control signal $V_{RF\ AGC}$ is also supplied to an analog-to-digital converter (ADC) 14. The output of the ADC 14 is connected to a microprocessor 16. The microprocessor 16 is connected to a non-volatile memory 20. Preferably, the microprocessor 16 is also connected to a display unit 22. Display unit 22 may be the cathode ray tube of the television. The microprocessor 16 has an output connected to a digital-to-analog converter (DAC) 18. The output of the DAC 18 provides a reference signal $V_{REF}$ to the AGC control circuit 12.

Figure 5:
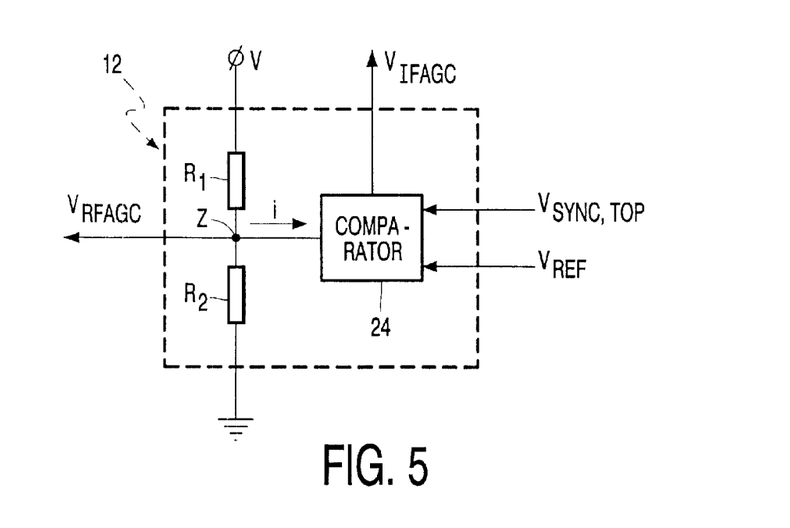
FIG. 5 shows an example of an implementation of a comparator used in the arrangement according to FIG. 4.

FIG. 5 schematically shows one embodiment of the AGC control circuit 12. The circuit 12 comprises a comparator 24 having two inputs for receiving the signals $V_{sync,\ top}$ and $V_{REF}$, respectively. The comparator 24 has two outputs for providing the AGC signals $V_{RF\ AGC}$ and $V_{IF\ AGC}$, respectively. The output providing $V_{RF\ AGC}$ is connected to a node Z which is the connection point of two resistors R1, R2. The other side of resistor R1 is connected to the power supply voltage V and the other side of resistor R2 is connected to ground. In operation a current i may flow from node Z to the comparator 24.

Now the operation of the circuit according to FIGS. 4 and 5 will be explained with reference to FIGS. 6 through 9. FIGS. 6 through 9 are only intended to illustrate the operation of the first AGC stage in the RF amplifier 3 and how this can be used to measure the strength of the antenna signal X at the input of RF amplifier 3. The second AGC stage in the IF amplifier 8, as controlled by AGC signal $V_{IF\ AGC}$ operates like the second AGC stage 7B in FIG. 1. This means that, as long as the strength of antenna signal X is below a predetermined threshold (corresponding to $V_{TH0}$ in FIG. 3), neither the first nor the second AGC stages will be active. In other words, for very small signal values of X, both AGC stages will have an attenuation value of substantially 0 dB. It is assumed that, then, the total amplification of the RF amplifier 3 and the mixer/oscillator 4 is 45 dB/$\mu$V. When X exceeds this predetermined level, the second AGC stage in the IF amplifier 8 becomes active and starts to attenuate the signal received at its input. When X exceeds a second threshold value (corresponding to $V_{TH2}$ in FIG. 3), the second AGC in the IF amplifier 8 stops increasing its attenuation and keeps a fixed attenuation factor. From that moment onwards, the first AGC starts to increase its attenuation factor. As explained above, this second threshold value is the "take-over-point". A frequently used value for X at this take-over-point is 60 dB/$\mu$V.

It is assumed that AGC control voltage $V_{RF\ AGC}$ is maximum as long as the first AGC stage in RF amplifier 3 is inactive and that, then, i=0 mA. Further assuming that all current from the power supply voltage V in the AGC control circuit 12, FIG. 5, is, then, flowing only through R1 and R2 and that R1=4.7 k$\Omega$ and R2=39 k$\Omega$, renders $V_{RF\ AGC}$=4.46 V for small values of X. This is shown in FIG. 6 which shows $V_{RF\ AGC}$ as a function of X.

Figure 6:
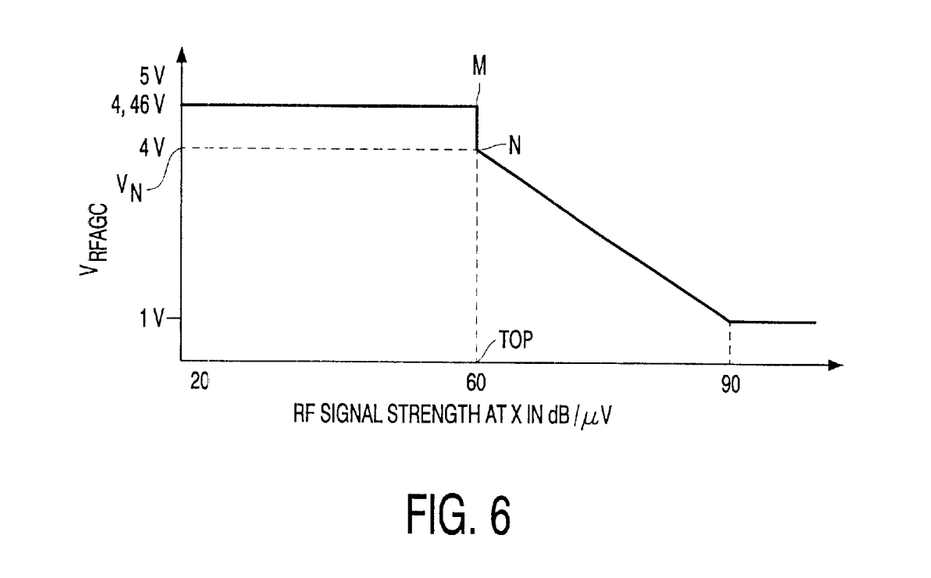
FIGS. 6 through 9 show diagrams for illustrating the operation of the arrangement according to FIG. 4.

At the take-over-point, indicated by M in FIG. 6, a changing input impedance of the RF amplifier 3 for $V_{RF\ AGC}$ or a changing output impedance of the comparator 24 causes, the value of $V_{RF\ AGC}$ to fall slightly to a lower value $V_N$ indicated by N in FIG. 6. $V_N$ may, e.g., be 4.2 V. Preferably, the RF amplifier 3 is arranged such that it has a maximum gain for $V_{RF\ AGC}$>4 V. The clear jump in the curve of FIG. 6 supports a reliable detection of the take-over-point TOP.

Figure 7:
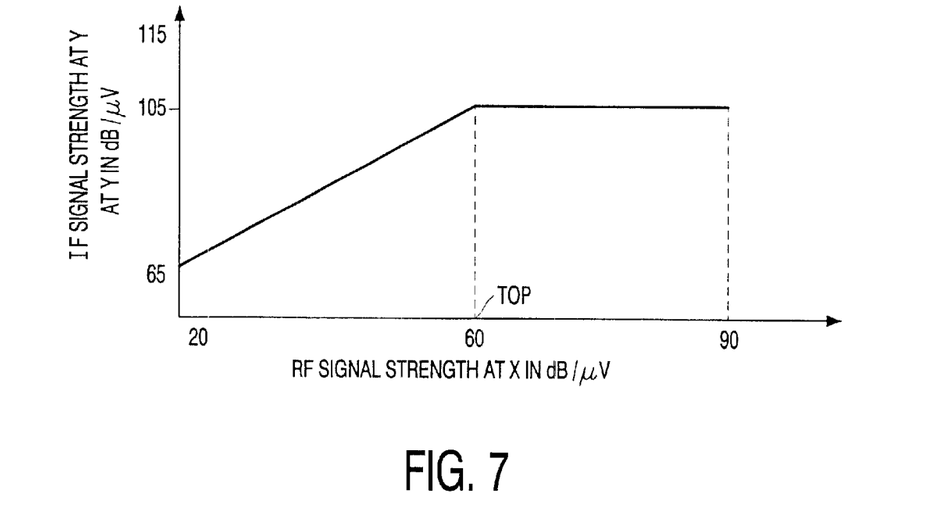

After the take-over-point $V_{RF\ AGC}$ decreases linearly with increasing value of X until the gain reduction of RF amplifier 3 reaches its maximum value. This latter point corresponds to X=90 dB/$\mu$V in FIG. 6. The first AGC stage in the RF amplifier 3 is arranged to show a linear increasing attenuation with decreasing values of $V_{RF\ AGC}$. Therefore, the IF signal strength of Y after the mixer/oscillator 4 is related to X as shown in FIG. 7.

For instance, when X=20 dB/$\mu$V, the AGC stage in RF amplifier 3 is inactive and Y=20+45 dB/$\mu$V=65 dB/$\mu$V. Until X=60 dB/$\mu$V (the take-over-point), Y follows from Y=X+45 dB/$\mu$V. After the take-over-point, the AGC stage in the RF amplifier will function to neutralize any increase in X such that Y remains substantially the same, as shown in FIG. 7. A slight increase of Y with increasing X would, then, also be allowable.

Figure 8:
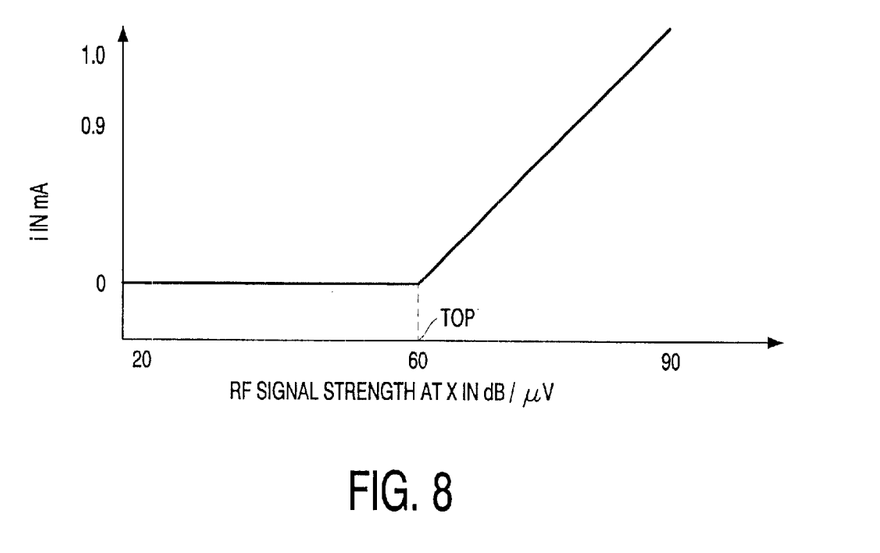
Figure 9:
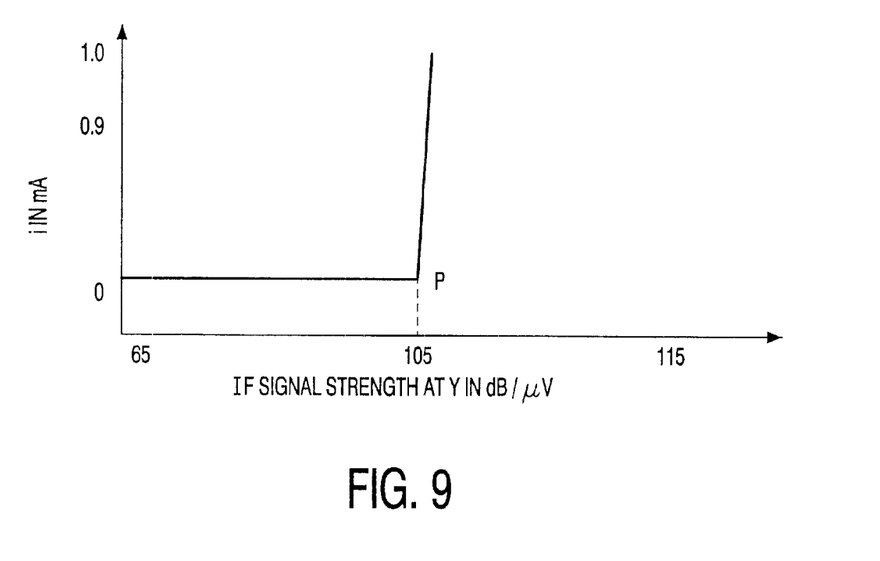

At the take-over-point, the second AGC stage in the IF amplifier 8 stops further increasing its attenuation and any increase of X would, without the first AGC stage in RF amplifier 3 being active, further increase the top level of the sync signal in the video detector 10. This would result in a higher value of $V_{sync,\ top}$. However, comparator 24 in AGC control circuit 12 compares $V_{sync,\ top}$ with $V_{REF}$ and, then, starts to drain current i from node Z to its output, in a way as shown in FIG. 8. By increasing i, the current through resistor R1 increases, resulting in a decreasing voltage at node Z and thus decreasing value of $V_{RF\ AGC}$, as shown in FIGS. 8 and 6, respectively. For values of X≧90 dB/$\mu$V, $V_{RF\ AGC}$ will be ≦1 V and no further increasing attenuation by the first AGC stage in RF amplifier 3 will be possible. Current i from node Z to the comparator 24 will reach its maximum value when X=90 dB/$\mu$V. However, since the attenuation by the first AGC stage in RF amplifier 3 substantially compensates any increase in the value of X for X≧60 dB/$\mu$V, the value of Y will remain substantially the same. Consequently, as shown in FIG. 9, current i may vary substantially without a substantial change in Y for 60 dB/$\mu$V≦X≦90 dB/$\mu$V.

Now, it will be explained how the value of $V_{RF\ AGC}$ may be used to measure the value of X.

In use, the microprocessor 16, generates a digital signal which is converted by DAC 18 into reference voltage $V_{REF}$. In the non-measuring mode of the arrangement, $V_{REF}$ is fixed and corresponds to the take-over-point of X=60 dB/$\mu$V, or Y=105 dB/$\mu$V. However, in accordance with the invention, the microprocessor is also arranged to operate in a measuring mode, the program for which is preferably stored in non-volatile memory 20 (it may also be stored in another type of memory not shown). The microprocessor controlled by this program is able to change the value of $V_{REF}$ in $m_{max}$ steps.

The arrangement is calibrated such that when Y reaches 105 dB/$\mu$V, the value of $V_{REF}$ corresponds to a predetermined step number $n_T$, where $0 \leq n_T \leq m_{max}$. For instance, $n_T$=32 and $m_{max}$=64. The value of $n_T$ is stored in memory 20. This calibrating is preferably done during manufacture of the arrangement. This can, e.g., be carried out by applying a signal of 105 dB/$\mu$V to the arrangement at point Y and by disconnecting antenna 1.

Figure 10:
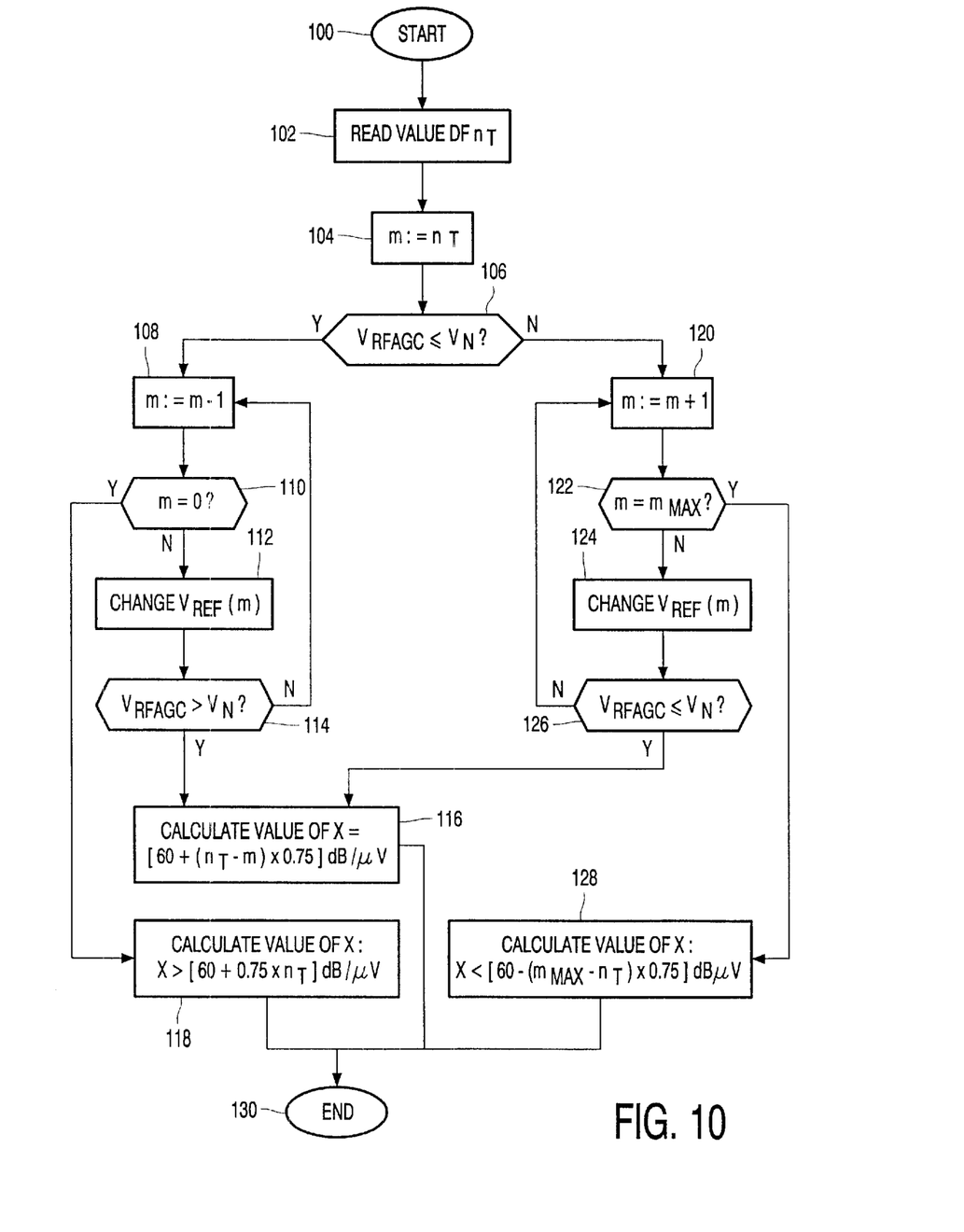
FIG. 10 is a flow chart illustrating a method of measuring the strength of the antenna signal supplied to the arrangement of FIG. 4.

FIG. 10 illustrates the program steps carried out by microprocessor 16 for calculating the value of X.

After the start, step 100, microprocessor reads $n_T$ from memory 20, step 102. In step 104, a parameter m is defined and made equal to $n_T$. In step 106, the microprocessor checks the value of $V_{RF\ AGC}$ as received through ADC 14. If $V_{RF\ AGC} \leq V_N$ ($V_N$ corresponds to the take-over-point), the program jumps to step 108; otherwise it jumps to step 120.

If the program jumps to step 108, this means that the first AGC stage in RF amplifier 3 is active and that X≧60 dB/$\mu$V (FIG. 6). In step 108, m is made 1 step smaller. In step 110, microprocessor 16 checks if the new value of m=0. If the new value of m=0, meaning that m cannot be further decreased, the program continues with step 118. If not, the program continues with step 112. In step 112, the microprocessor changes the value of $V_{REF}$ such that the take-over-point N changes to a higher value of X.

In step 114, the program checks whether $V_{RF\ AGC} > V_N$. If so, this is an indication that X now equals this new take-over-point. Consequently, X may be calculated from the following equation:

$$X = [TOP + (n_T - m) \times Ss] dB/\mu V \tag{1}$$

as shown in step 116. In the equation above, "TOP" denotes the original take-over-point which in the present example is 60 dB/$\mu$V, and "Ss" denotes the value of a predetermined step size parameter corresponding to one step of change in $V_{REF}$ and, in this example, being equal to 0.75.

If, in step 114, it is established that $V_{RF\ AGC}$ is still $\leq V_N$, steps 108 through 114 are repeated as many times as is necessary to change the take-over-point towards the actual value of X. Steps 108 through 114 are only left at step 110 if it appears that m=0. Then, the take-over-point cannot be increased anymore. This is a safety measure for large values of X. The only thing that can be calculated is:

$$X > [TOP + n_T \times Ss] dB/\mu V \tag{2}$$

which corresponds to X>84 dB/$\mu$V for TOP=60, $n_T$=32 and Ss=0.75.

When, in step 106, it was established that $V_{RF\ AGC} > V_N$, this means that the first AGC stage is inactive and X<60 dB/$\mu$V (take-over-point TOP). The program jumps to step 120 where m is made 1 step larger. In step 122, it is checked whether m exceeds a predetermined maximum value $m_{max}$. If so, the value of m cannot be increased anymore and the program jumps to step 128.

If m<$m_{max}$, the program jumps to step 124 where it makes the microprocessor change $V_{REF}$ by one step in such a way that the take-over-point TOP is decreased by one step towards the actual value of X. As soon as the amended value of TOP reaches the actual value X, the first AGC stage in RF amplifier 3 will become active, which is checked in step 126. Step 126 checks this by establishing whether or not $V_{RF\ AGC}$ falls below the value of $V_N$.

If the answer to the test in step 126 is positive, this means that the take-over-point has been decreased such that X equals the new take-over-point. Then, X can be calculated by equation (1) as presented in step 116.

If, however, the answer to the test in step 126 is negative, the program continues increasing m by one step by jumping back to step 120. Steps 120 through 126 are repeated as many times as is necessary to change the take-over-point such that it equals the actual value of X. Again, there is a safety measure by checking whether or not m=$m_{max}$ in step 122. If so, the program jumps to step 128. Then, the only thing that can be established is that:

$$X < [TOP - (m_{max} - n_T) \times Ss] dB/\mu V \tag{3}$$

which equals X<36 dB/$\mu$V for TOP=60, $n_T$=32 and $m_{max}$=64.

After steps 116, 118, and 128, the program will jump to its end, step 130. The program illustrated above allows X to be accurately measured in an interval of 36 to 84 dB/$\mu$V for TOP=60, $n_T$=32 and $m_{max}$=64. It is to be understood that, by selecting other values for these parameters, other intervals can be covered as well.

In FIG. 10, in steps 108, 120 it is illustrated that the microprocessor changes m by one step. However, in an alternative embodiment m may be changed by another step value, for instance 5, until it is detected that the first AGC stage has become active or inactive (i.e., the take-over-point has been exceeded), respectively, and then, while changing the direction of amending m, change m with a smaller step value, for instance 1, for fine adjustment. This increases the speed of measurement.

After having calculated the value of X in the way described above, the microprocessor preferably outputs this value of X to a user, e.g., through the television screen 22. This may be done during a predetermined time interval and may also be repeated after a predetermined other time interval.

Figure 11:
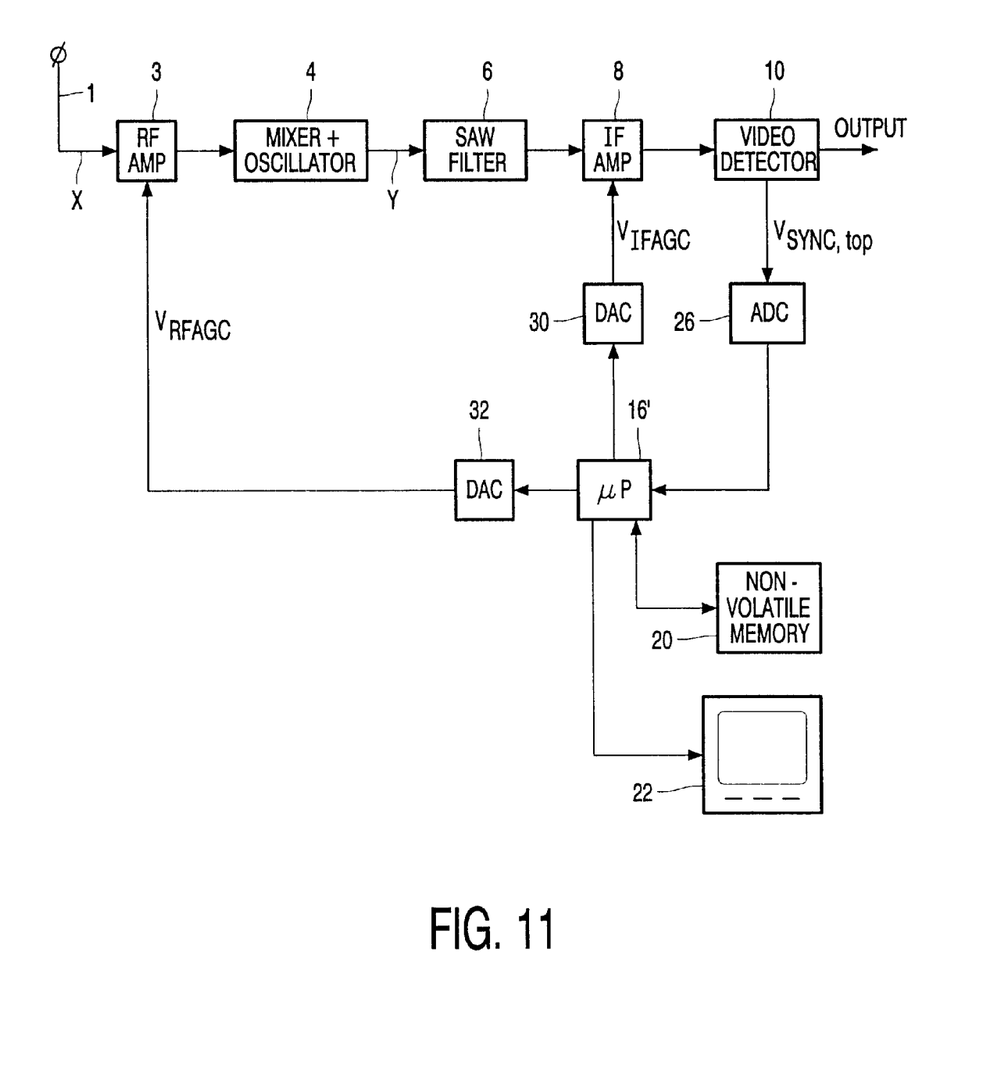
FIG. 11 shows an alternative embodiment of the invention.

An embodiment of an arrangement for measuring the antenna signal strength as supplied to a receiver/tuner arrangement has been described above. As may be evident to persons skilled in the art, the circuit diagrams are not presented as limiting the scope of the present invention. For instance, the AGC control circuit 12 is shown as an analog circuit. However, its functionality may be implemented by digital circuits. Alternatively, it may be implemented as a distinct microprocessor unit. It may even be combined with the microprocessor unit 16 into a microprocessor 16', as shown in FIG. 11. Then, the microprocessor unit 16' directly receives the $V_{sync, top}$ signal through an A/D converter 26. Moreover, the microprocessor 16' converts calculated digital automatic gain control signals into analog automatic gain control signals $V_{RF\ AGC}$ and $V_{IF\ AGC}$ through two D/A converters 30, 32. Microprocessor 16' is then arranged to provide the functionality of both the automatic gain control circuit 12 and the microprocessor 16 as explained above.

Moreover, it is envisaged that other circuit blocks may also be implemented in digital form in future systems, e.g., in one microprocessor only. Then, the AGC signals $V_{RF\ AGC}$ and $V_{IF\ AGC}$ may also be digital signals.

In a further alternative embodiment, the current i towards the comparator 24 may be measured instead of automatic gain control signal $V_{RF\ AGC}$, and supplied to the microprocessor 16. As is evident from FIG. 8, also the value of current i is an indication whether or not the first automatic gain control stage in RF amplifier 3 is active and can be used to detect when the new take-over-point has reached the actual value of antenna signal X.

As is evident to persons skilled in the art, the microprocessor 16, 16' will be controlled by a computer program provided with suitable instructions. Such a program may be loaded into, e.g., the non-volatile memory 20 from a computer-readable medium like a diskette or a CDROM, or may be downloaded through, e.g., the Internet. To that end, the microprocessor 16, 16' will be connected to suitable interface means (not shown).

In summary, the present invention relates to arrangements and methods for measuring an antenna signal strength (X), the arrangement comprising:
a first amplifier section (3) for receiving an antenna signal and having a first automatic gain control stage;
a second amplifier section (8) having a second automatic gain control stage;
automatic gain control means (12; 16') for generating automatic gain control signals ($V_{RF\ AGC}$, $V_{IF\ AGC}$) for the first and second amplifier sections in accordance with a delayed automatic gain control scheme with a take-over-point; for measuring the antenna signal strength, the take-over-point is automatically shifted towards the actual antenna signal strength.

What is claimed is:

1. An arrangement for measuring an antenna signal strength (X), the arrangement comprising:
a first amplifier section for receiving an antenna signal and for providing a first output signal, having a first automatic gain control stage with a first attenuation factor controlled by a first automatic gain control signal ($V_{RF\ AGC}$);
a second amplifier section for receiving a first input signal derived from said first output signal, for providing a second output signal, and having a second automatic gain control stage with a second attenuation factor controlled by a second automatic gain control signal ($V_{IF\ AGC}$);
automatic gain control means arranged to receive a second input signal ($V_{sync,\ top}$) derived from the second output signal and to generate said first and second automatic gain control signals in dependence on the second output signal;
wherein:
for values of said antenna signal below a predetermined threshold level (TOP), only said second automatic gain control stage may be active with an increasing second attenuation factor for increasing values of the antenna signal;
for values of said antenna signal above said predetermined threshold level (TOP), said first automatic gain control stage is active with increasing first attenuation factor for increasing values of the antenna signal;
wherein a processor is arranged to calculate said antenna signal strength (X) in accordance with the following steps:
establishing whether or not said first automatic gain control stage is active;
if said first automatic gain control stage is active, increasing said predetermined threshold level (TOP) to a first new threshold level such that said first new threshold level is equal to said antenna signal strength (X) and the first automatic gain control stage starts to become inactive, and calculating said antenna signal strength as being equal to said first new threshold level; and
if said first automatic gain control stage is inactive, decreasing said predetermined threshold level (TOP) to a second new threshold level such that said second new threshold level is equal to said antenna signal strength (X) and the first automatic gain control stage starts to become active, and calculating said antenna signal strength as being equal to said second new threshold level.

2. An arrangement for measuring an antenna signal strength (X), the arrangement comprising:
a first amplifier section for receiving an antenna signal and for providing a first output signal, and having a first automatic gain control stage with a first attenuation factor controlled by a first automatic gain control signal ($V_{RF\ AGC}$);
a second amplifier section for receiving a first input signal derived from said first output signal, for providing a second output signal, and having a second automatic gain control stage with a second attenuation factor controlled by a second automatic gain control signal ($V_{IF\ AGC}$);
automatic gain control means arranged to receive a second input signal derived from the second output signal and to generate said first and second automatic gain control signals dependent upon the second output signal;

wherein:
for values of said antenna signal below a predetermined threshold level (TOP), only said second automatic gain control stage may be active with an increasing second attenuation factor for increasing values of the antenna signal;

for values of said antenna signal above said predetermined threshold level (TOP), said first automatic gain control stage is active with increasing first attenuation factor for increasing values of the antenna signal;

wherein a processor is arranged to calculate said antenna signal strength (X) in accordance with the following steps:

(a) establishing whether or not said first automatic gain control stage is active;

(b) if said first automatic gain control stage is active, increasing said predetermined threshold level (TOP) to a first new threshold level such that this first new threshold level is equal to said antenna signal strength (X) and the first automatic gain control stage starts to become inactive, and calculating said antenna signal strength as being equal to said first new threshold level; if said predetermined threshold level cannot be increased to said first new threshold level but only to a predetermined maximum level, then, calculating said antenna signal strength as being larger than said predetermined maximum level; and (c) if said first automatic gain control stage is inactive, decreasing said predetermined threshold level (TOP) to a second new threshold level such that this second new threshold level is equal to said antenna signal strength (X) and the first automatic gain control stage starts to become active, and calculating said antenna signal strength as being equal to said second new threshold level; if said predetermined threshold level cannot be decreased to said second new threshold level but only to a predetermined minimum level, then, calculating said antenna signal strength as being smaller than said predetermined minimum level.

3. An arrangement as claimed in claim 1 or 2, wherein said processor comprises a microprocessor having an input connected to an A/D converter, an output connected to a D/A converter and further connected to a memory, the A/D converter being connected to said automatic gain control means for receiving said first automatic gain control signal ($V_{RF\ AGC}$), said D/A converter supplying a reference signal ($V_{REF}$) to said automatic gain control means, and said memory storing a value ($n_T$) related to said predetermined threshold (TOP).

4. An arrangement as claimed in claim 3, wherein said automatic gain control means comprises a comparator arranged to receive and compare said reference signal ($V_{REF}$) and said second output signal ($V_{sync,\ top}$).

5. An arrangement as claimed in claims 1 or 2, wherein said processor is connected to a display device which displays said antenna signal strength (X) as calculated by the processor.

6. An arrangement as claimed in claims 1 or 2, wherein said arrangement comprises a television tuner including said first amplifier section and a mixer stage arranged to receive said antenna signal and convert said television signal into an intermediate frequency signal (Y), a video detector arranged to detect a video signal from said intermediate frequency signal, said second amplifier section being coupled between said tuner and said video detector.

7. An arrangement as claimed in claims 1 or 2, wherein said automatic gain control means and said processor are integrated in one processor.

8. A method of measuring antenna signal strength (X) of an antenna signal supplied to an arrangement, the arrangement comprising:

a first amplifier section for receiving an antenna signal, for providing a first output signal, and having a first automatic gain control stage with a first attenuation factor controlled by a first automatic gain control signal ($V_{RF\ AGC}$);

a second amplifier section for receiving a first input signal derived from said first output signal, for providing a second output signal, and having a second automatic gain control stage with a second attenuation factor controlled by a second automatic gain control signal ($V_{IF\ AGC}$);

automatic gain control means arranged to receive a second input signal derived from the second output signal and to generate said first and second automatic gain control signals dependent upon the second output signal;

the method including the following steps:

for values of said antenna signal below a predetermined threshold level (TOP), activating only said second automatic gain control stage with an increasing second attenuation factor for increasing values of the antenna signal;

for values of said antenna signal above said predetermined threshold level (TOP), activating said first automatic gain control stage with increasing first attenuation factor for increasing values of the antenna signal; and calculating said antenna signal strength (X) in accordance with the following steps:

(a) establishing whether or not said first automatic gain control stage is active;

(b) if said first automatic gain control stage is active, increasing said predetermined threshold level (TOP) to a first new threshold level such that said first new threshold level is equal to said antenna signal strength (X) and the first automatic gain control stage starts to become inactive, and calculating said antenna signal strength as being equal to said first new threshold level; and (c) if said first automatic gain control stage is inactive, decreasing said predetermined threshold level (TOP) to a second new threshold level such that said second new threshold level is equal to said antenna signal strength (X) and the first automatic gain control stage starts to become active, and calculating said antenna signal strength as being equal to said second new threshold level.

9. A method of measuring an antenna signal strength (X) supplied to an arrangement, the arrangement comprising:

a first amplifier section (3) for receiving an antenna signal, for providing a first output signal and being provided with a first automatic gain control stage with a first attenuation factor controlled by a first automatic gain control signal ($V_{RF\ AGC}$);

a second amplifier section (8) for receiving a first input signal derived from said first output signal, for providing a second output signal and being provided with a second automatic gain control stage with a second attenuation factor controlled by a second automatic gain control signal ($V_{IF\ AGC}$);

automatic gain control means (12; 16') arranged to receive a second input signal ($V_{sync,\ top}$) derived from the second output signal and to generate said first and second automatic gain control signals ($V_{RF\ AGC}$, $V_{IF\ AGC}$) in dependence on the second output signal ($V_{sync,\ top}$);

the method including the following steps:

for values of said antenna signal below a predetermined threshold level (TOP), activating only said second automatic gain control stage with increasing second attenuation factor with increasing values of the antenna signal;

for values of said antenna signal above said predetermined threshold level (TOP), activating said first automatic gain control stage with increasing first attenuation factor with increasing values of the antenna signal;

wherein a processor (16; 16') is arranged to calculate said antenna signal strength (X) in accordance with the following steps:

(a) establishing whether or not said first automatic gain control stage is active;

(b) if said first automatic gain control stage is active, increasing said predetermined threshold level (TOP) to a first new threshold level such that this first new threshold level is equal to said antenna signal strength (X) and the first automatic gain control stage starts to become inactive, and calculating said antenna signal strength as being equal to said first new threshold level; if said predetermined threshold level cannot be increased to said first new threshold level but only to a predetermined maximum level, then, calculating said antenna signal strength as being larger than said predetermined maximum level;

(c) if said first automatic gain control stage is inactive, decreasing said predetermined threshold level (TOP) to a second new threshold level such that this second new threshold level is equal to said antenna signal strength (X) and the first automatic gain control stage starts to become active, and calculating said antenna signal strength as being equal to said second new threshold level; if said predetermined threshold level cannot be decreased to said second new threshold level but on to a predetermined minimum level, then, calculating said antenna signal strength as being smaller than said predetermined minimum level.

10. A computer program product for measuring an antenna signal strength (X) supplied to an arrangement, the arrangement comprising:

a first amplifier section (3) for receiving an antenna signal, for providing a first output signal and being provided with a first automatic gain control stage with a first attenuation factor controlled by a first automatic gain control signal ($V_{RF\ AGC}$);

a second amplifier section (8) for receiving a first input signal derived from said first output signal, for providing a second output signal and being provided with a second automatic gain control stage with a second attenuation factor controlled by a second automatic gain control signal ($V_{IF\ AGC}$);

automatic gain control means (12; 16') arranged to receive a second input signal ($V_{sync,\ top}$) derived from the second output signal and to generate said first and second automatic gain control signals ($V_{RF\ AGC}$, $V_{IF\ AGC}$) in dependence on the second output signal ($V_{sync,\ top}$);

the arrangement being arranged such that:

for values of said antenna signal below a predetermined threshold level (TOP), only said second automatic gain control stage may be active with increasing second attenuation factor with increasing values of the antenna signal;

for values of said antenna signal above said predetermined threshold level (TOP), said first automatic gain control stage is active with increasing first attenuation factor with increasing values of the antenna signal;

wherein said arrangement comprises a processor (16; 16') arranged to carry out a method of calculating said antenna signal strength (X) after having read said computer program product in accordance with the following steps:

(a) establishing whether or not said first automatic gain control stage is active;

(b) if said first automatic gain control stage is active, increasing said predetermined threshold level (TOP) to a first new threshold level such that this first new threshold level is equal to said antenna signal strength (X) and the first automatic gain control stage starts to become inactive, and calculating said antenna signal strength as being equal to said first new threshold level;

(c) if said first automatic gain control stage is inactive, decreasing said predetermined threshold level (TOP) to a second new threshold level such that this second new threshold level is equal to said antenna signal strength (X) and the first automatic gain control stage starts to become active, and calculating said antenna signal strength as being equal to said second new threshold level.

11. A computer-readable medium provided with a computer program product as claimed in claim 10.

12. A computer program product for measuring an antenna signal strength (X) supplied to an arrangement, the arrangement comprising:

a first amplifier section (3) for receiving an antenna signal, for providing a first output signal and being provided with a first automatic gain control stage with a first attenuation factor controlled by a first automatic gain control signal ($V_{RF\ AGC}$);

a second amplifier section (8) for receiving a first input signal derived from said first output signal, for providing a second output signal and being provided with a second automatic gain control stage with a second attenuation factor controlled by a second automatic gain control signal ($V_{IF\ AGC}$);

automatic gain control means (12; 16') arranged to receive a second input signal ($V_{sync,\ top}$) derived from the second output signal and to generate said first and second automatic gain control signals ($V_{RF\ AGC}$, $V_{IF\ AGC}$) in dependence on the second output signal ($V_{sync,\ top}$);

the arrangement being arranged such that:

for values of said antenna signal below a predetermined threshold level (TOP), only said second automatic gain control stage may be active with increasing second attenuation factor with increasing values of the antenna signal;

for values of said antenna signal above said predetermined threshold level (TOP), said first automatic gain control stage is active with increasing first attenuation factor with increasing values of the antenna signal;

wherein said arrangement comprises a processor (16 16') arranged to carry out a method of calculating said antenna signal strength (X) after having read said computer program product in accordance with the following steps:

(a) establishing whether or not said first automatic gain control stage is active;

(b) if said first automatic gain control stage is active, increasing said predetermined threshold level (TOP) to a first new threshold level such that this first new threshold level is equal to said antenna signal strength (X) and the first automatic gain control stage starts to become inactive, and calculating said antenna signal strength as being equal to said first new threshold level; if said predetermined threshold level cannot be increased to said first new threshold level but only to a predetermined maximum level, then, calculating said antenna signal strength as being larger than said predetermined maximum level;

(c) if said first automatic gain control stage is inactive, decreasing said predetermined threshold level (TOP) to a second new threshold level such that this second new threshold level is equal to said antenna signal strength (X) and the first automatic gain control stage starts to become active, and calculating said antenna signal strength as being equal to said second new threshold level; if said predetermined threshold level cannot be decreased to said second new threshold level but only to a predetermined minimum level, then, calculating said antenna signal strength as being smaller than said predetermined minimum level.

13. A computer-readable medium provided with a computer program product as claimed in claim 12.

14. An automatic gain control apparatus adapted to measure antenna signal strength, said apparatus comprising:

a first amplifier section for receiving an antenna signal and having a first automatic gain control stage, a second amplifier section coupled in cascade with the first amplifier section and having a second automatic gain control stage, automatic gain control means for generating first and second automatic gain control signals for the first and second amplifier sections, respectively, in accordance with a delayed automatic gain control procedure that provides a predetermined threshold level (TOP), and means coupled to said automatic gain control means for calculating said antenna signal strength; said calculating means comprising;

means for automatically shifting the predetermined threshold level (TOP) towards the antenna signal strength, and means for determining, at a new threshold level (TOP) at which the first automatic gain control stage becomes active or inactive, that the antenna signal strength is equal to said new threshold level.

15. The automatic gain control apparatus as claimed in claim 14 wherein the automatic shifting means is operative to determine whether the first automatic gain control stage is active or inactive, and if active, increasing the predetermined threshold level (TOP) to a first new threshold level at which the first automatic gain control stage starts to become inactive, which indicates that said first new threshold level is equal to the antenna signal strength (X); and if inactive, decreasing the predetermined threshold level (TOP) to a second new threshold level at which the first automatic gain control stage starts to become active, which indicates that said second new threshold level is equal to the antenna signal strength (X).

16. The automatic gain control apparatus as claimed in claim 14 further comprising;

means coupled between said first and second amplifier sections for converting the antenna signal into an intermediate frequency signal, a video detector responsive to the intermediate frequency signal to derive a video signal, and wherein the second amplifier section is coupled between the first amplifier section and the video detector.

17. The automatic gain control apparatus as claimed in claim 14 wherein said calculating means comprises a microprocessor having an input that receives the first automatic gain control signal from the automatic gain control means via an analog/digital converter and an output for supplying a reference signal ($V_{REF}$) to the automatic gain control means via a digital/analog converter, wherein, during an antenna signal strength calculating operation, the reference signal ($V_{REF}$) is variable.

18. The automatic gain control apparatus as claimed in claim 17 further comprising;

a memory device coupled to the microprocessor, wherein the memory device stores a value ($n_T$) related to the predetermined threshold level (TOP).

19. The automatic gain control apparatus as claimed in claim 17 wherein the microprocessor comprises means for determining whether the first automatic gain control signal is equal to or less than the predetermined threshold level (TOP).

20. The automatic gain control apparatus as claimed in claim 14 wherein the automatic shifting means shifts the predetermined threshold level (TOP) irrespective of any interference present in a signal channel including the cascade coupled first and second amplifier sections.

21. The automatic gain control apparatus as claimed in claim 14 wherein said calculating means is responsive to the first automatic gain control signal and supplies a reference signal ($V_{REF}$) to the automatic gain control means, and the apparatus further comprises a video detector responsive to an output signal of the second amplifier section to derive a feedback control signal related to a video signal and which is supplied to the automatic gain control means.

22. The automatic gain control apparatus as claimed in claim 14 wherein the antenna signal strength determining means determines the antenna signal strength on the basis of the value of the first automatic gain control signal at the new threshold level (TOP).

* * * * *